July 14, 1925.
H. SAUVEUR
BRAKE PRESSURE REGULATOR FOR ROAD VEHICLES
Filed Feb. 14, 1924
1,546,027
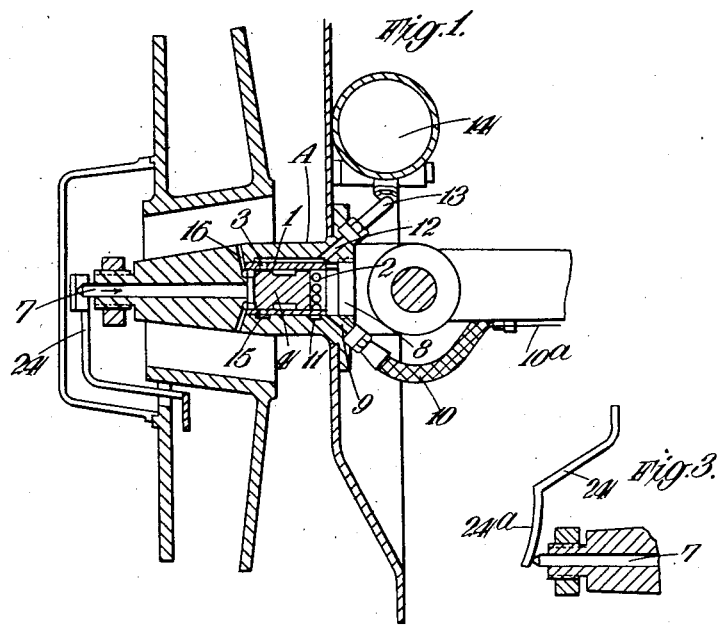
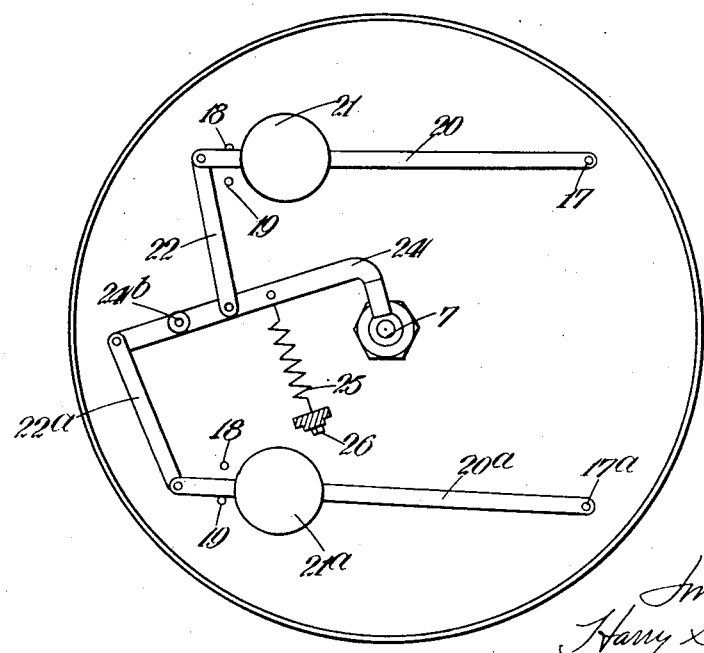
Inventor: Harry Sauveur Patented July 14, 1925.

1,546,027

UNITED STATES PATENT OFFICE.

HARRY SAUVEUR, OF BERLIN-LANKWITZ, GERMANY, ASSIGNOR TO HANDEL-MAATSCHAPPIJ H. ALBERT DE BARY & CO., OF AMSTERDAM, NETHERLANDS.

BRAKE-PRESSURE REGULATOR FOR ROAD VEHICLES.

Application filed February 14, 1924. Serial No. 692,809.

*To all whom it may concern:*

Be it known that I, HARRY SAUVEUR, a citizen of the German Republic, residing at 8 Franzstrasse, Berlin-Lankwitz, Germany, have invented certain new and useful Improvements in or Relating to Brake-Pressure Regulators for Road Vehicles, of which the following is a specification.

This invention relates to brake pressure regulators for road vehicles having compressed air brakes, the object thereof being to set free the wheels to rotate if they skid or become scotched, owing to the brakes being applied too strongly, or owing to the road being smooth or slippery. A disadvantage of the known brake pressure regulator applied to motor-cars is that a single regulator acts on all four wheels, or at least on the two wheels driven by the motor, while when applying the brakes on a worn or uneven road each of the four wheels may momentarily be rotating at a different speed, or one of the wheels may skid while the others continue to rotate, so that the driver may lose all control over the vehicle, particularly when one of the front wheels becomes scotched on a sloping road. In order to avoid this disadvantage, according to the present invention, each wheel provided with a brake apparatus is also provided with an automatic centrifugal governor which suspends the action of the brake when the rotation of the wheel ceases or falls below a predetermined speed.

In order that the said invention may be clearly understood and readily carried into effect, the same will now be described more fully with reference to the accompanying drawings illustrating a constructional example of means for putting this invention in practice.

Figure 1 represents in vertical section a portion of the front wheel of a motor car embodying this invention.

Figure 2 represents in elevation a centrifugal governor which is enclosed in a casing on the said wheel.

Figure 3 is a plan illustrating a detail hereinafter mentioned.

In a boring in the stump of the axle A is carried a sleeve 1, in which are two rows of holes 2 and 3 arranged in circles. In the sleeve 1 is carried a piston 4, the diameter of which is reduced in the centre, and against one end of the said piston bears a thrust pin 7, which is adapted to be moved by a lever 24 in the direction indicated by the arrow, Figure 1, for which purpose the lever 24 is provided with an inclined projection 24$^a$ (see Figure 3). The chamber in which the sleeve 1 and the piston 4 are contained is hermetically closed by means of the screw threaded disc 8. Into the piston chamber opens a passage 9, which is connected by a flexible connection 10 to the compressed air brake pipe 10$^a$. Holes 2 arranged round the sleeve 1 in a circle open into an annular passage 11, which communicates by the passage 12 and the pipe 13 with the brake cylinder 14. Another series of circular holes 3 opens into the annular collecting passage 15, which is connected by the outlets 16 with the atmosphere.

The centrifugal governor shown in Figure 2 consists of two levers 20, 20$^a$ adapted to turn on studs 17, 17$^a$ and carrying weights 21, 21$^a$. The said levers are connected by tie rods 22, 22$^a$ with the lever 24 which acts on the thrust pin 7 in the manner shown in Figure 3. A tension or retractile spring 25 attached to the lever 24 tends to draw the lever constantly against the pin in such a way that the latter is moved in the direction indicated by the arrow in Figure 1 and thus tends to thrust the piston towards the right (Figure 1). The movement of each of the levers 20, 20$^a$ is limited by stops 18 and 19. The power of the spring 25 can be regulated in the well known way by a nut 26.

The action of the apparatus is as follows:—

When the wheel rotates with a certain number of revolutions the centrifugal weights 21, 21$^a$ will be swung outwards; the lever 24 is consequently turned on its pivot 24$^b$ which movement takes it away from the pin 7 and stretches the spring 25. If now compressed air passes in front of the piston 4 when the brake is applied, the piston will be thrust towards the left until it is prevented from moving any further by the head of the pin 7. This causes the holes 2 to be uncovered, when the brake cylinder of this individual wheel is operated. When the piston 14 is in this position any desired increase or decrease of the force with which the brakes are applied can be produced by admitting compressed air or allowing it to escape by means of the driver's brake valve. If the number of revolutions made by a wheel provided with the apparatus is below that required to overcome the tension of the spring 25, the force of this spring acting on the lever 24 presses the thrust pin 7 and consequently the piston 4 back in the direction indicated by the arrow, with the result that the air under pressure in the brake cylinder escapes through the pipe 13, the hole 12, and the holes 3 now uncovered by the piston 4 and out into the open air through the outlets 16. The action of the brake is thus slackened and the rotation of the wheel in question recommences.

The double piston 4 illustrated shows only one constructional form which has been selected as an example, but other well known mechanical devices such as balanced valves, slide valves or the like may be used in place thereof.

What I claim and desire to secure by Letters Patent of the United States is:—

1. In a road vehicle having compressed air brakes, road wheels, a brake adapted to act on each of said wheels, an automatic centrifugal governor operated by each wheel independently of the other wheels, and adjustable means to cause any one of said governors to suspend the operation of its associated brake, when the speed of rotation of the associated wheel has decreased under the braking action to a predetermined extent.

2. In a road vehicle having compressed air brakes, a road wheel, a brake cylinder to apply a brake to said road wheel, a compressed air pipe, a valve chamber interposed between said cylinder and said pipe and having an outlet to atmosphere, a valve movable in said chamber, a centrifugal governor on said wheel adapted to operate said valve, and adjustable means to counteract the centrifugal forces acting on said governor, said means operating when the speed of rotation of said wheel has decreased to a predetermined extent to cause said valve to place said cylinder in communication with said outlet.

3. In a road vehicle having compressed air brakes, a road wheel the axle of which has a longitudinal bore and outlets to the atmosphere from said bore, a brake cylinder adapted to communicate with said bore, a piston slidable in said bore to close alternately said outlets and the communication to said cylinder, a pipe opening into said bore to deliver compressed air therein to force said piston in one direction, and a spring-loaded centrifugal governor comprising a lever adapted to effect the sliding of the piston in the opposite direction.

4. In a road vehicle having compressed air brakes acting on a plurality of road wheels, an automatic centrifugal governor on each of said wheels, and adjustable means to cause said governor to suspend the operation of said brake in any individual wheel independently of the other wheels when the speed of rotation of said individual wheel has decreased under the braking action to a predetermined extent.

5. In a road vehicle having compressed air brakes acting on a plurality of road wheels, an automatic governor for controlling the rotation of each wheel independently of the others, and adjustable means to cause said governor to suspend the operation of said brake on any individual wheel independently of the other wheels when the speed of rotation of said individual wheel has decreased under the braking action to a predetermined extent.

6. In a road vehicle having compressed air brakes a road wheel, a brake cylinder to apply a brake to said road wheel, a compressed air conduit to the brake cylinder, a valve interposed in said conduit governing an outlet to the atmosphere, a centrifugal governor for controlling the speed of each wheel and adapted to operate said valve, and adjustable means to counteract the centrifugal forces acting on said governor, said means operating when the speed of rotation of said wheel has decreased to a predetermined extent to cause said valve to place said cylinder in communication with said outlet.

7. In a road vehicle having compressed air brakes, road wheels, a brake cylinder to apply a brake to each wheel independently of the other wheels, a compressed air conduit to the brake cylinder, valve means intercepting said conduit and having an outlet to the atmosphere, and a passage to permit flow to the said braking cylinder, said outlet and passage being closed alternately, and governor means for controlling the operation of the valve means.

8. In a road vehicle having compressed air brakes, a road wheel, an axle of which has a longitudinal bore and an outlet to the atmosphere from said bore, a brake cylinder adapted to communicate with said bore, a piston slidable in said bore to close alternately said outlet and the communication to the cylinder, a pipe opening into said bore to deliver compressed air therein to force the piston in one direction, a thrust pin slidable in said bore and engaging said piston, and a centrifugal governor including a lever having an inclined portion engageable with the thrust pin to effect the sliding of the piston in the opposite direction.

HARRY SAUVEUR.